(12) United States Patent
Roosenboom

(10) Patent No.: US 8,830,063 B2
(45) Date of Patent: Sep. 9, 2014

(54) SYSTEM FOR RECOGNIZING ANIMALS

(75) Inventor: Derk Jan Roosenboom, Haaksbergen (NL)

(73) Assignee: Nedap Agri B.V., Groenlo (NL)

( * ) Notice: Subject to any disclaimer, the term of this patent is extended or adjusted under 35 U.S.C. 154(b) by 487 days.

(21) Appl. No.: 12/664,039

(22) PCT Filed: Jun. 13, 2008

(86) PCT No.: PCT/NL2008/050378
§ 371 (c)(1),
(2), (4) Date: Feb. 5, 2010

(87) PCT Pub. No.: WO2008/153393
PCT Pub. Date: Dec. 18, 2008

(65) Prior Publication Data
US 2010/0156612 A1    Jun. 24, 2010

(30) Foreign Application Priority Data

Jun. 13, 2007   (NL) ..................................... 1033982

(51) Int. Cl.
*G08B 13/14*    (2006.01)
(52) U.S. Cl.
USPC .............. 340/572.1; 340/572.2; 340/572.7; 340/10.42; 370/334
(58) Field of Classification Search
CPC ............ G06K 7/0008; G06K 19/0723; G06K 19/07749; G07C 9/00111; G08G 1/017; A01K 11/006; G06Q 10/08; G06Q 10/087; G08B 13/2442; G08B 13/2474; G08B 13/2471; G08B 13/2408; G08B 13/2431
USPC ..................... 340/10.42, 572.1, 572.2, 572.7; 370/334; 455/278.1, 296, 63.1, 454, 455/450
See application file for complete search history.

(56) References Cited

U.S. PATENT DOCUMENTS

| 6,445,296 | B1 * | 9/2002 | Sadler ......................... 340/572.1 |
| 2002/0101847 | A1 * | 8/2002 | Bolgiano et al. .............. 370/347 |
| 2003/0001755 | A1 * | 1/2003 | Tiernay et al. ................ 340/928 |

(Continued)

FOREIGN PATENT DOCUMENTS

| EP | 1 211 630 A | 6/2002 |
| NL | 1 099 065 C1 | 6/1999 |
| WO | WO 01/67853 A | 9/2001 |

OTHER PUBLICATIONS

International Search Report dated Sep. 1, 2008, for PCT/NL2008/050378.

*Primary Examiner* — Omer S Khan
(74) *Attorney, Agent, or Firm* — Leydig, Voit & Mayer, Ltd.

(57) ABSTRACT

A system for recognizing animals in a detection zone (4) wherein the animals are provided with a label (6.*i*) that responds by transmitting a return signal with information when the label is (6.*i*) introduced into an electromagnetic interrogation field, provided with at least a transmitting and receiving system (2) for transmitting the electromagnetic interrogation field in the detection zone (4) and for receiving a return signal from a label (6.*i*) located in the detection zone (4), whereby the transmitting and receiving system (2) is provided with a plurality of antennas (8.*i*) for receiving a return signal from at least one label (6.*i*) present in the detection zone (4) wherein the antennas (8.*i*) are designed and arranged to discretely receive electromagnetic signals which come from mutually different subzones (4.*i*) wherein the subzones (4.*i*) in combination from the detection (4) zone.

30 Claims, 5 Drawing Sheets

(56) References Cited

U.S. PATENT DOCUMENTS

| | | | |
|---|---|---|---|
| 2003/0125040 A1* | 7/2003 | Walton et al. | 455/454 |
| 2004/0072545 A1* | 4/2004 | Hamalainen et al. | 455/101 |
| 2006/0109125 A1* | 5/2006 | Overhultz et al. | 340/572.1 |
| 2007/0097935 A1* | 5/2007 | Gorokhov et al. | 370/338 |
| 2007/0229260 A1* | 10/2007 | Braun et al. | 340/572.1 |
| 2008/0079577 A1* | 4/2008 | Malik | 340/572.1 |

\* cited by examiner

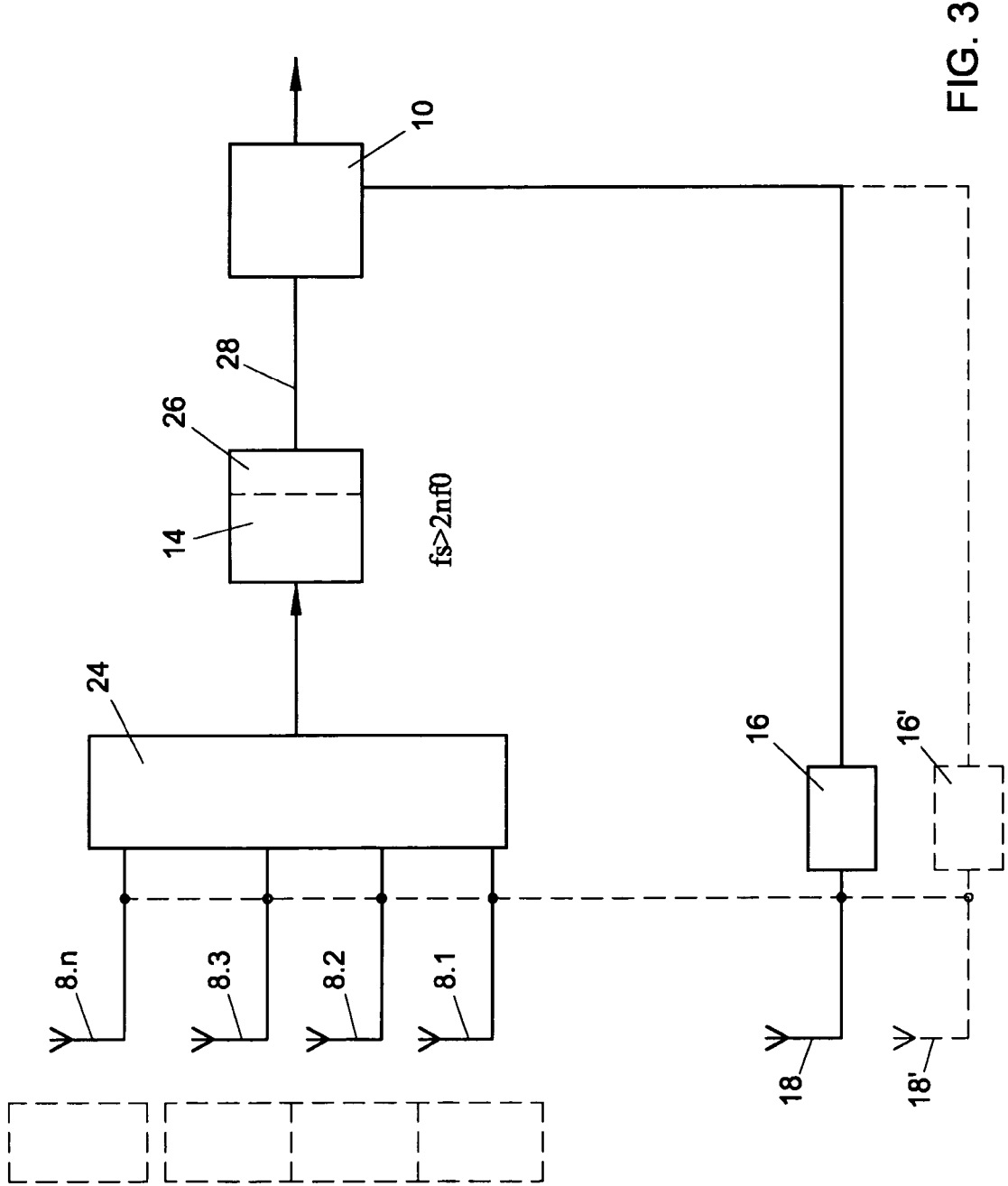

SYSTEM FOR RECOGNIZING ANIMALS

FIELD OF THE INVENTION

The invention relates to a system for recognizing animals in a detection zone wherein the animals are provided with a label that responds by transmitting a return signal with information when the label is introduced into an electromagnetic interrogation field, provided with at least a transmitting and receiving system for transmitting the electromagnetic interrogation field in the detection zone and for receiving a return signal from a label that is present in the detection zone.

BACKGROUND

Such a system is known per se. The current systems used for walk-through, walk-along or walk-over recognition comprise a large transmitting antenna which ensures the activation of the labels and which is also used for the reception of the return signal. Here, an absorption system is involved. The labels used in these systems are relatively large while the orientation of the labels is controllable. So-called management labels can for instance be considered in the form of an ear stud or labels attached to the neck of an animal.

Regarding the international legislation, more and more so-called I&R labels find use in walk-through recognitions. These so-called I&R labels are small electronic earmarks and/or electronic boluses. What is also considered is the use of smaller labels that are implanted subcutaneously. The characteristic of such labels is that due to their smaller size, they often produce a smaller return signal than the above-mentioned labels. Another problem is that interference of the reception of the return signal from these labels can occur due to the presence of, for instance, fluorescent lamps with electronic ballasts, frequency controls for electric motors, transmitters that emit in the same frequency range, etc. When a plurality of labels are simultaneously present in the detection zone and is activated, the return signals from these labels will furthermore interfere with each other.

SUMMARY OF THE INVENTION

The object of the invention is either to reduce or to solve the problems mentioned.

To this end, the system according to the invention is characterized in that the transmitting and receiving system is provided with a plurality of antennas for receiving a return signal from at least one label present in the detection zone, the antennas being designed and arranged to discretely receive electromagnetic signals that come from mutually different subzones while in combination, the subzones form the detection zone.

As the subzones are smaller than the detection zone, a received return signal will be less susceptible to interference from other sources. The fact is that interferences from other sources that are present in other subzones can be eliminated. Only the electromagnetic field that relates to, for instance, one single subzone (or group of subzones) can, if desired, be utilized for receiving the return signal. Thus, it is also possible to determine in which subzone (or group of subzones) a label is present so that determination of location can take place. Further, the chance that at least two labels are in one subzone is smaller than the chance that at least two labels are in the detection zone. This provides the possibility to detect the presence of at least two labels in the detection zone without the return signal of these labels interfering with each other. The fact is that when different labels are in different subzones or groups of subzones, if desired, per subzone or groups of subzones, a return signal can be received.

Thus, the possibility is also created to orientate the antennas as required relative to each other so that a particular detection zone can be covered optimally with the aid of the different antennas. Now that determination of location is possible, as explained hereinabove, also, the direction in which the animal walks can be determined. According to a practical embodiment, it holds that the mutually discrete, electromagnetic signals are received separately from each other.

Preferably, it holds that with each antenna, one subzone is covered.

According to a further elaboration of a system according to the invention it holds that a plurality of neighbouring subzones adjoin each other and/or partly overlap each other.

It holds in particular that the transmitting and receiving system is provided with a signal processing unit wherein the transmitting and receiving system generates a receiving signal per antenna and/or per group of antennas, wherein the receiving signals are processed in combination by the signal processing unit for obtaining the information from the return signal of at least one label present in the detection zone.

Processing the receiving signals in combination may provide for the receiving signals to be correlated with each other so that the return signal from a label or the return signals from different labels present in the detection zone can be detected. If a label is present in, for instance, the border area of two neighbouring subzones, the return signal can be detected in each subzone. When with each antenna a detection zone is covered and when, furthermore, with the aid of each antenna a receiving signal is generated, this may provide for the receiving signals of the antennas located at the two neighbouring subzones to be correlated with each other for detecting the return signal of the respective label. In such a case it is also possible, when for instance two labels are present in two subzones that are mutually different, that the receiving signal associated with one subzone is used for detecting the label in the respective subzone while the receiving signal associated with the other subzone is used for detecting the label present in the other subzone.

Here, it holds in particular that the transmitting and receiving system generates a receiving signal per antenna. However, this is not necessary. It is, for instance, also possible that per group of antennas one receiving signal is generated. Here, a first group of antennas that differs from a second group of antennas can comprise antennas that are not in the second group while the second group of antennas comprises antennas which are not in the first group. It is, however, also possible that in such a case, the two groups share a number of antennas and do not share another number of antennas. As stated, in the most practical embodiment it holds, however, that each antenna is associated with one receiving signal and that each receiving signal is associated with one antenna.

Here, it is possible that a receiving signal concerns a received electromagnetic signal. In particular, this received electromagnetic signal can be stripped of its carrier wave. In particular, it holds that the transmitting and receiving system is provided with A/D converter means for obtaining digitalized receiving signals.

According to a further elaboration of the invention, it holds that the transmitting and receiving system is provided with a plurality of receivers wherein each receiver is connected with one antenna or with a group of antennas for generating a receiving signal per antenna or per group of antennas.

However, according to an alternative further embodiment of the invention, it holds that the transmitting receiving system is provided with a multiplexer which is connected with each of the antennas for each time selecting one antenna or a group of antennas from the plurality of antennas for successively obtaining the different receiving signals per antenna or per group of antennas which are supplied to the signal processing unit to be processed further. The last variant has as an advantage that this variant is economically advantageous because owing to the multiplexer it is not necessary to provide the system with a plurality of receivers.

For a special embodiment of the system it holds that a plurality of the antennas are designed as walk-through antennas. In particular it holds that the transmitting and receiving system is provided with at least one transmitter for generating the interrogation field. According to a further elaboration of this, it holds that the system is further provided with at least one transmitting antenna which is connected with the at least one transmitter for generating the interrogation field. Here, the system involves a so-called transmission system. It is, however, also possible that the at least one transmitter is connected with a plurality of the antennas mentioned. Then, the system can be designed as a so-called absorption system.

More particularly, it holds that the transmitting and receiving system is designed for generating the interrogation field in the form of a rotating field. This can be carried out in a manner known per se by using different transmitting antennas wherein to the transmitting antennas, a transmission signal shifted in phase relative to each other is supplied for obtaining the rotating interrogation field. In particular it holds that the system is further provided with the I&R labels mentioned. It also holds in particular that a plurality of antennas are included in a housing.

BRIEF DESCRIPTION OF THE DRAWINGS

Presently, the invention will be described in further detail on the basis of the drawing. In the drawing:

FIG. 3 shows a third embodiment of a system according to the invention;

DETAILED DESCRIPTION OF THE DRAWINGS

Figure 1:
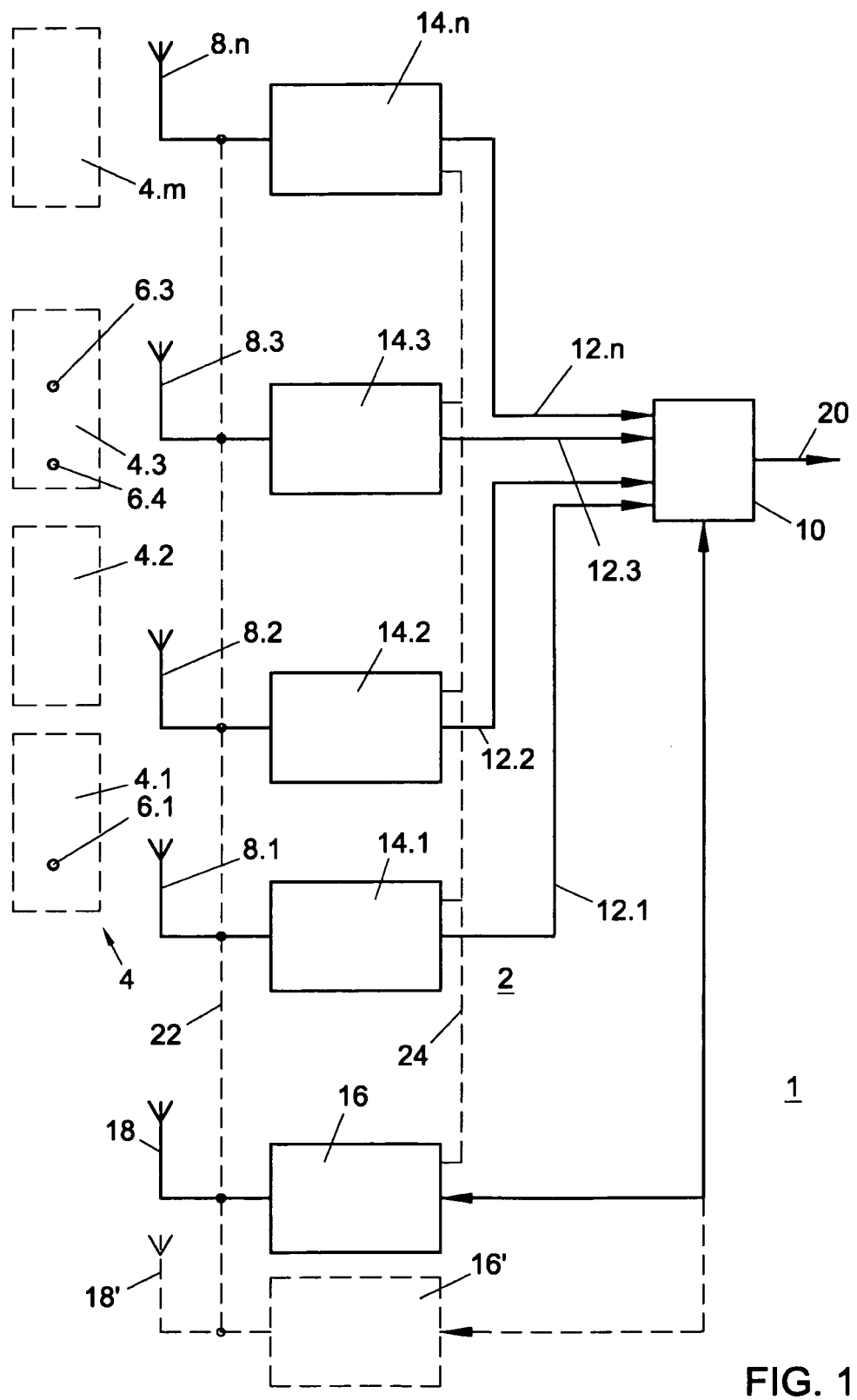
FIG. 1 shows a first embodiment of a system according to the invention.

In FIG. 1, with reference numeral 1, a system for recognizing animals in a detection zone is indicated. Here, the detection of animals is involved which are provided with a label that responds by transmitting a return signal with information when the label is introduced into an electromagnetic interrogation field. The system is provided with at least a transmitting and receiving system 2 for transmitting the electromagnetic interrogation field in the detection zone 4 which is schematically indicated in FIG. 1. The transmitting and receiving system is also for receiving a return signal from a label 6.1 that is present in the detection zone 4.

The transmitting and receiving system 2 is provided with a plurality of antennas $8.i$ ($i=1, 2, 3, \ldots n$) for receiving a return signal from at least one label present in the detection zone. Here, n is a natural number greater than or equal to 2. The antennas $8.i$ are designed and arranged for receiving electromagnetic signals from different subzones $4.j$ ($j=1, 2, 3, \ldots m$) where m is a natural number greater than or equal to 2. The subzones $4.j$ in combination form the detection zone 4. In this example, it holds that with each antenna $8.i$ one subzone $4.j$ is covered. It further holds in this example that a plurality of the neighbouring subzones adjoin each other and/or partly overlap each other.

More particularly it holds here that neighbouring subzones ($4.j$, $4.j+1$), as schematically indicated, adjoin each other. However, in practice they will slightly overlap. As, in this example, with each antenna, one subzone is covered and as each subzone corresponds to one antenna, in this example it holds that $n=m$.

The transmitting and receiving system is provided with a signal processing unit 10. In this example, the system is designed such that on lines $12.i$ ($i=1, 2, \ldots n$) a plurality of receiving signals are generated which are supplied to the signal processing unit 10. In this example, it holds that different receiving signals have been generated with mutually different antennas or with mutually different combinations of antennas. As will be discussed further in the following, it holds in this example that different receiving signals are generated with mutually different antennas. The receiving signals are processed in combination by the signal processing unit for obtaining information from the return signal from a label 6.1 present in the detection zone. In this example, it holds that the transmitting and receiving system generates a receiving signal per antennas. It further holds that the receiving signal involves a received electromagnetic signal that is stripped of its carrier wave. To this end, the transmitting and receiving system is provided with a plurality of receivers $14.i$ ($i=1, 2, \ldots n$) wherein it holds that the receiver $14.i$ is connected with the antenna $8.i$ ($i=1, 2, \ldots n$). All this entails that with mutually different receivers, in this example, signals are received from mutually different subzones. With the aid of each receiver, one receiving signal is generated. In this example it also holds that each antenna is each time connected with only one of the receivers and that each receiver is each time connected with only one antenna. Each receiver further generates a receiving signal that is stripped of its carrier wave. On the lines $12.n$ therefore, analogue receiving signals are supplied to the signal processing unit 10. The system is further provided with at least one transmitter 16 which is connected with at least one transmitting antenna 18. With the aid of the transmitter 16 and the transmitting antenna 18, the electromagnetic interrogation field is generated in the zone 4.

The operation of the system described so far is as follows. With the aid of the transmitter 16 and the transmitting antenna 18, the electromagnetic interrogation field is generated in the detection zone 4. In this example, a label 6.1 may be present in the subzone 4.1. The label 6.1 is for instance an I&R label known per se. Such a label can be provided with a resonant circuit and a small processing unit such as, for instance, a microprocessor in which for instance an identification code has been stored. The resonant circuit picks up energy from the interrogation field and activates its processing unit therewith. The processing unit of the label then generates the identification code which, in turn, with the aid of the resonant circuit, is transmitted by means of the return signal. With the aid of the receiver 14.1 and the antenna 8.1 this return signal from the subzone 4.1 is received. Then, this return signal, which in fact involves a response (HDX of FDX system) and in particular a modulation (FDX system) of the interrogation field, is stripped by the receiver 14.1 from its carrier wave and supplied via line 12.1 to the signal processing unit 10. This signal processing unit 10 recognizes the return signal on line 12.1 and will ignore, for the further processing of the return signal, the signals that are present on the other lines 12.2-12.n. The fact is that in this example, on these lines, there is no information present about the respective return signal. The result is that any interference that may occur in the subzones 4.2-4.m does not adversely affect the received return signal. Despite the fact that the return signal from the label 6.1 is relatively weak because it involves an I&R label, the return signal can still be received well in this manner. If a receiving antenna were to be used that covers the entire zone, this receiving antenna would receive much more interference than the interference coming from only the subzone 4.1. As a result, the return signal can be detected much better than when the return signal were to be detected with the aid of a receiving antenna that covers the entire detection zone 4.

If, furthermore, in this example, a label 6.3 were present in the subzone 4.3, a receiving signal containing the return signal from the label 6.3 is generated on the line 12.3 by the receiver 14.3 and the antenna 8.3. A result is that the return signals from the label 6.1 and 6.3 can be detected independently of each other and be processed further by the signal processing unit 10. If the entire detection zone were to be covered by one single receiving antenna, it would not be possible to detect the two return signals independently of each other and they would interfere with each other so that detection of the return signals in a separate and mutually discrete manner becomes difficult, if not impossible.

If a label 6.4 is present adjacent a border area of neighbouring subzones as in this example the subzone 4.2 and 4.3, then, the return signal from the label 6.4 will be received by both the receiver 14.2 and the receiver 14.3. Then, the receiving signals on the lines 12.2 and 12.3 both comprise information about the respective return signal. In this example, the signal processing unit 10 is designed such that it can correlate the receiving signals on the lines 12.2 and 12.3 with each other to determine that one and the same return signal is involved in order to detect the respective return signal and determine, for instance, the identification code transmitted by the label 6.4.

The data thus obtained in the example given hereinabove, such as for instance the identification codes, are offered by the signal processing unit on line 20 for further processing such as for instance storing in the computer or presentation on a display.

On the basis of the apparatus of FIG. 1, different variants are possible. For instance, the receivers 14.i can each be provided with an A/D convertor for digitalizing the receiving signals on the lines 12.i. The signal processing unit 10 can be designed as a digital signal processing unit.

It is further possible that the system is further provided with other transmitters. In this example, a further transmitter 16' with an antenna 18' is shown. Here, the transmitters are used in combination for generating the interrogation field. It is also possible that with the aid of the transmitters 16, 16' and antennas 18, 18' in a manner known per se a rotating interrogation field is generated. This can for instance be realized in that with the transmitter 16 and the antenna 18 a first interrogation field is generated while with the transmitters 16' and the antenna 18' a second interrogation field is generated. If the interrogations field shift for instance 90 degrees in phase relative to each other, and the antennas are designed as, for instance, loop antennas that have a predetermined orientation relative to each other and in a manner known per se, the rotating field can be generated in the detection zone.

The above-described system with separate transmitting and receiving antennas operates as a transmission system. It is also possible, as indicated with the dotted line 22, that the antennas 8.1-8.n are also used as transmitting antennas. In that case, the system can be designed as an absorption system.

In this example, it holds that each receiver is connected with a single antenna. However, it is also possible that each receiver is connected with a group of antennas. Then, with one group of antennas, for instance, one subzone can be covered. Here, different groups of antennas can comprise a number of different antennas but also a number of similar antennas. These similar antennas then provide for the subzones associated with the different groups of antennas to partly overlap.

It is also conceivable that a first receiver is connected with two antennas that cover two mutually different subzones. Here, with one single receiver, labels from two subzones can be detected. The subzones may then preferably not be neighbouring. This provides for a relatively inexpensive manner of still detecting a return signal per subzone while the use of a separate receiver for each subzone is not necessary. Thus, it is possible that each receiver is connected with a group of antennas so that with mutually different receivers signals are received from predetermined, mutually different groups of subzones. With one group of antennas, more than one subzone are covered (also forming a group). A more detailed example is that for instance with the aid of a first receiver which is coupled to the antennas of the group of antennas comprising the antennas 8.1 and 8.3, signals are received from the group comprising the subzones 4.1 and 4.3, while with a second receiver that is coupled to the antennas of the group of antennas comprising the antennas 8.2 and 8.4, signals are received from the group comprising subzones 4.2 and 4.4.

Such variants are each understood to fall within the framework of the invention. In the example, the transmitter 16 and the transmitter 16' are further connected with the signal processing unit 10. This is so in order for the signal processing unit to control the transmitters for transmitting on a desired carrier wave frequency. Also, a replica of the transmitting signal can be supplied to the signal processing unit 10 and/or to the receivers 14.i by means of line 24 for the purpose of stripping a received signal from its carrier wave and/or for obtaining the return signal.

Figure 2:
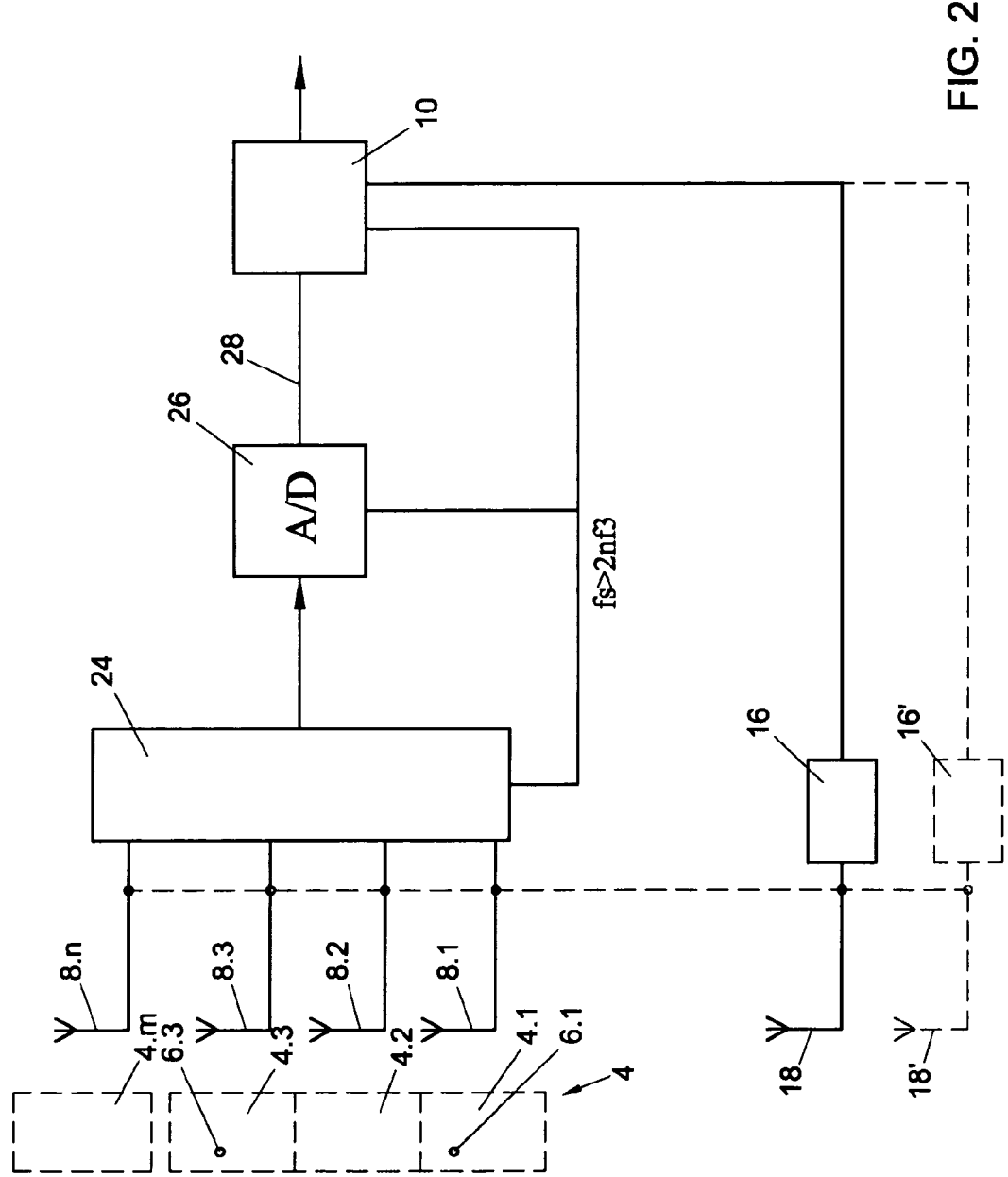
FIG. 2 shows a second embodiment of a system according to the invention.

Presently, on the basis of FIG. 2, a first alternative embodiment of a system according to the invention is indicated. Here, corresponding parts are indicated with the same reference numerals.

Instead of with the separate receivers 14.i, the system according to FIG. 2 is provided with a multiplexer 24 and an A/D convertor 26. With the aid of the multiplexer 24, the antennas 8.1-8.n are successively connected with the A/D convertor. The A/D convertor digitalizes the successive receiving signals for obtaining digitalized receiving signals on line 28. Therefore, the receiving signals on line 28 involve a digitalized form of the transmitted electromagnetic return signal from a label. If the interrogation field has a frequency fz, the A/D convertor will have a sample frequency that is preferably greater than n×2 fz. Here, n is the number of receiving signals that is supplied to the multiplexer 24. The digital signal processing unit 10 processes the digitalized receiving signals successively obtained in a manner completely analogous to that as discussed on the basis of FIG. 1. For instance, from the receiving signal coming from the antenna 8.1, again, the label 6.1 can be detected and from the receiving signal coming from the antenna 8.3, the label 6.3 can be detected. All this is completely analogous to what is discussed on the basis of FIG. 1.

FIG. 3 shows a third variant of a system according to the invention wherein parts corresponding to FIGS. 1 and 2 are provided with the same reference numerals. In FIG. 3, with the aid of the multiplexer 24, electromagnetic signals received with the antennas 8.1-8.*n*, respectively, are supplied to a single receiver 14. The receiver strips the received signals of its carrier wave so that on the line 28, successively, analogue receiving signals are detected and generated which are supplied to the signal processing unit 10 to be processed further as discussed in the basis of FIGS. 1 and 2. In particular, it holds that the receiver is further provided with an A/D convertor 26 so that on the line 28 digitalized receiving signals are generated which are supplied to the signal processing unit. The sample frequency $f_s$ will preferably be greater than $2 \cdot n \cdot f_0$, with $f_0$ being the base frequency of the analogue receiving signals. Here, the analogue receiving signals correspond with the return signals. In case an A/D converter is used, the signal processing unit 10 is a digital signal processing unit. Otherwise, the apparatus operates completely analogously to what is discussed on the basis of FIGS. 1 and 2 and also, all variations described with reference to FIGS. 1 and 2, such as the use of groups of antennas and the like, can be applied. This also holds for the use of rotating fields etc.

Figure 4A:
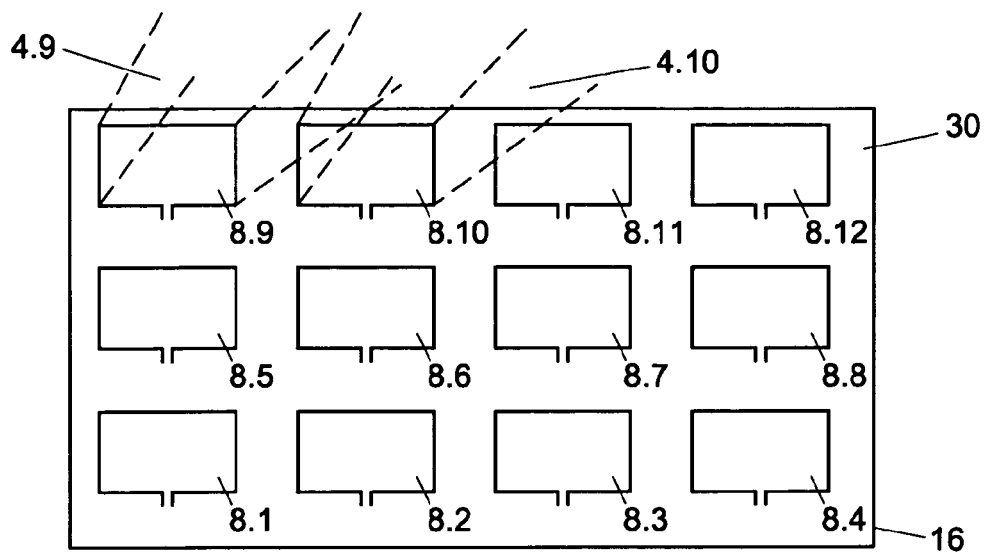
FIG. 4a shows a side view of a possible arrangement of antennas of a system according to the invention viewed in the direction of the arrow P1 of FIG. 4b.
Figure 4B:
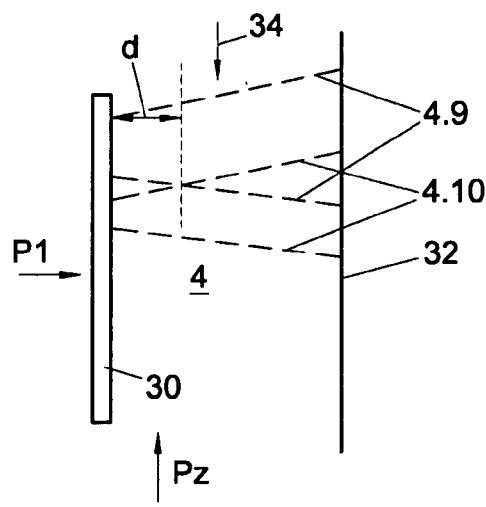
FIG. 4b shows a top plan view of the antennas of FIG. 4a which are arranged to be used with a walk-through recognition.
Figure 4C:
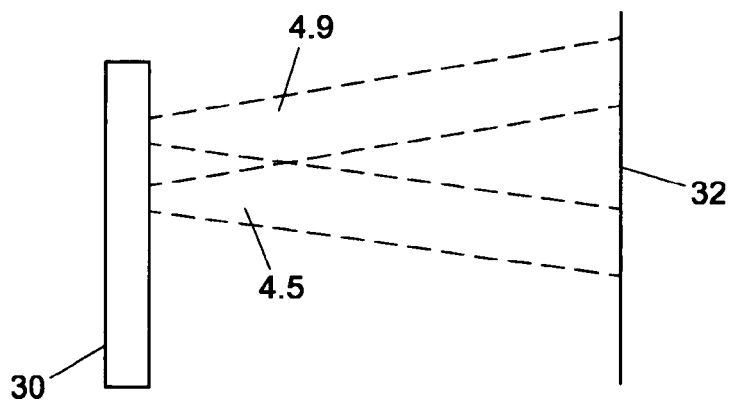
FIG. 4c shows a view of FIG. 4b in the direction of the arrow P2 of FIG. 4b.

A possible arrangement of the antennas is shown in FIGS. 4*a*-4*c*. In FIGS. 4*a*-4*c*, it holds that FIG. 4*a* shows a view of the antennas in the direction of the arrow P1 of FIG. 4*b*. It further holds that FIG. 4*c* shows a view in the direction of the arrow P2 of FIG. 4*b*. The antennas 8.1 (i=1, 2, . . . 12) are arranged in a vertical, flat plane 30. The vertical, flat plane 30 and, in this example, a wall 32 bound the detection zone 4 which, in this example, is a walk-through zone that animals, such as cows, can walk through in the direction of the arrow 34. In the flat plane 30, there is also a large transmitting antenna 16 for generating the electromagnetic interrogation field in the detection zone. In this example, the detection zone 4 is divided into subzones 4.*i*, wherein in FIGS. 4*a* and 4*b*, schematically, subzones 4.9 and 4.10 are indicated. At a distance d which is indicated in FIG. 4*b*, these subzones will start to overlap each other. In FIG. 4*c*, also, the boundary of the overlying subzone 4.9 and the underlying subzone 4.5 is indicated. It therefore holds here that the subzones 8.5-8.8 are located above the subzones 8.1-8.4. It also holds, for instance, that the subzones 8.1, 8.5, 8.9 are separated in horizontal direction from the subzones 8.2, 8.6 and 8.10. The antennas 16 and 8.*i* can for instance be included in one housing.

Figure 5A:
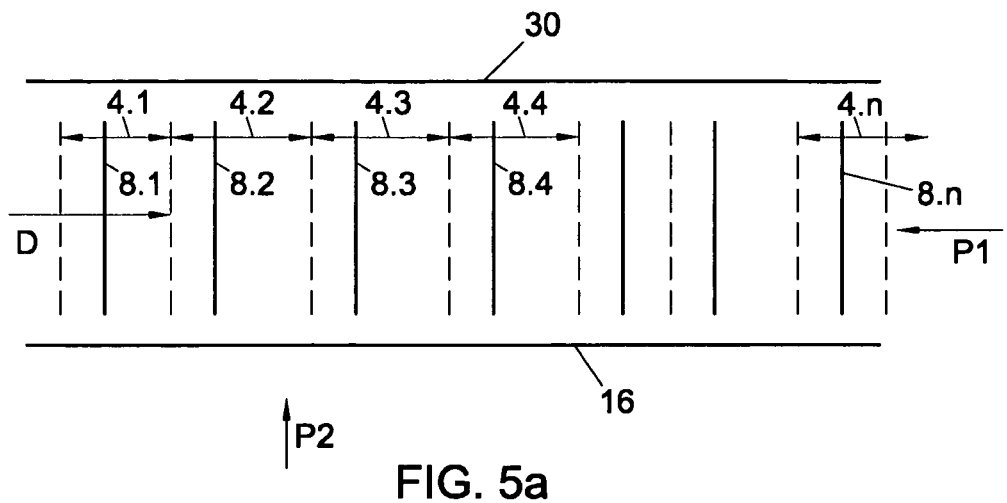
FIG. 5a shows a possible arrangement of antennas in the form of walk-through antennas.
Figure 5B:
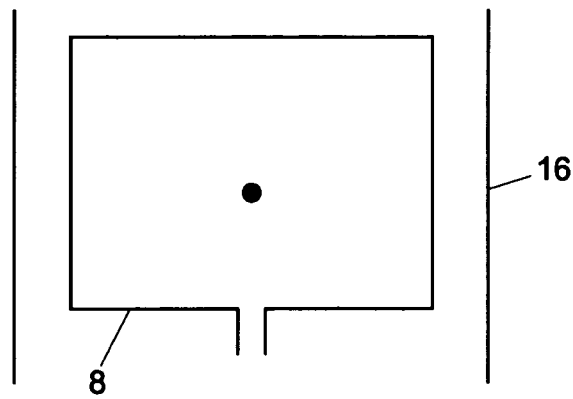
FIG. 5b shows a side view of FIG. 5a in the direction of the arrow P.
Figure 5C:
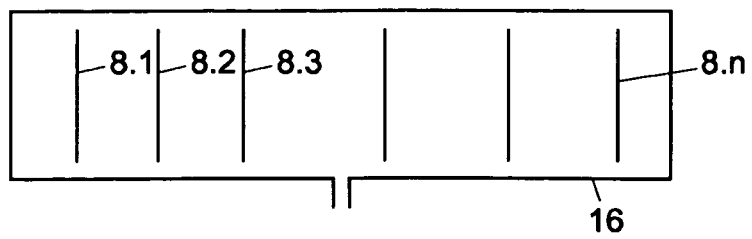
FIG. 5c shows a side view of the antennas system according to FIG. 5a in the direction of the arrow P2.

In FIGS. 5*a* and 5*b*, an alternative arrangement of antennas of the system according to the invention is indicated. The system is again provided with a wall 32 placed in a vertical plane 30. Also, the system is provided with a large loop-shaped transmitting antenna 16. The loop-shaped transmitting antenna 16 and the wall 32 bound a detection zone 4 through which an animal that is to be recognized can advance. The walk-through direction is indicated with, for instance, arrow D. FIG. 5*b* shows a side view of the antenna system according to FIG. 5*a* in the direction of the arrow P1 of FIG. 5*a*. FIG. 5*c* shows a side view of the antenna system according to FIG. 5*a* in the direction of the arrow P2. It is directly clear that the antennas 8.6 are designed here as so-called walk-through antennas. In FIG. 5*a*, the subzones 4.*j* are indicated in dots. The operation of the system is further completely analogous to what is described on the basis of FIGS. 1-3. An animal with a label that moves through detection zone 4 in the direction of the arrow D will be successively detected in the subzones 4.1, 4.2, 4.3, etc by means of the antennas 8.1, 8.2, 8.3 etc, respectively. As stated, the antennas for each of the above-outlined embodiments can be included in one housing. This is not necessary. They can also be arranged in mutually different housings, or separately. Such variants are each understood to fall within the framework of the invention.

The invention claimed is:

1. A system for recognizing animals in a detection zone wherein the animals are provided with labels that respond by transmitting return signals with information when introduced into an electromagnetic interrogation field, the system comprising:
   a transmitting and receiving system configured to create the electromagnetic interrogation field throughout the detection zone and receive a return signal from a label present in the detection zone, the transmitting and receiving system comprising:
      a single transmitter at only one location and a transmitting antenna connected to the single transmitter, the single transmitter and the transmitting antenna being configured to generate the electromagnetic interrogation field throughout the detection zone,
      a plurality of receiving antennas, distinct from the transmitting antenna, configured to receive the return signal from the label present in the detection zone, the plurality of receiving antennas being designed and arranged to discretely receive electromagnetic signals, generated by labels, respectively coming from mutually different subzones, the mutually different subzones, in combination, forming the detection zone,
      a multiplexer signally connected with each of the plurality of receiving antennas, and
      a signal processing unit,
   wherein the transmitting and receiving system generates a receiving signal per receiving antenna or per group of receiving antennas of the plurality of receiving antennas,
   wherein the processing unit is configured to process, in combination, multiple ones of the receiving signal to render information from the return signal from the label, received by at least one of the receiving antenna or the group of receiving antennas, present in the detection zone,
   wherein the multiplexer is configured to time select the receiving antenna or the group of receiving antennas from the plurality of receiving antennas, to successively obtain the receiving signal from a time selected receiving antenna or group of receiving antennas,
   wherein the receiving signals signal from the time selected receiving antenna or group of receiving antennas is supplied to the signal processing unit to be processed further, and
   wherein the multiplexer, for each time selection, connects the time selected receiving antenna or group of receiving antennas with a receiver for obtaining the receiving signal that is stripped of a carrier wave.

2. The system according to claim 1, wherein each antenna of the plurality of receiving antennas covers one subzone of the mutually different subzones.

3. The system according to claim 1, wherein the plurality of receiving antennas further comprises mutually different groups of receiving antennas.

4. The system according to claim 3, wherein a group of the mutually different groups of receiving antennas covers one group of subzones of the mutually different subzones.

5. The system according to claim 3, wherein a group of the mutually different groups of receiving antennas covers one subzone of the mutually different subzones.

6. The system according to claim 1, wherein each subzone of the mutually different subzones is covered by only one receiving antenna.

7. The system according to claim 1, wherein the mutually different subzones adjoin each other and partly overlap each other.

8. The system according to claim 1 wherein the plurality of receiving antennas comprises mutually different groups of receiving antennas, and wherein the transmitting and receiving system generates one receiving signal per group of receiving antennas.

9. The system according to claim 1 wherein each subzone of the mutually different subzones is covered by one receiving antenna, and the transmitting and receiving system generates one receiving signal per receiving antenna.

10. The system according to claim 1, wherein the transmitting and receiving system further comprises an analog to digital convertor for obtaining digitalized receiving signals.

11. The system according to claim 1, wherein the transmitting and receiving system further comprises a plurality of receivers wherein each of the plurality of receivers is connected with one receiving antenna or with one group of receiving antennas for generating one receiving signal per receiving antenna or per group of receiving antennas.

12. The system according to claim 11, wherein each receiving antenna is connected with, at any given time, only one of the plurality of receivers.

13. The system according to claim 11 wherein each subzone is covered by one receiving antenna and each of the plurality of receivers is connected with, at any given time, one of the plurality of receiving antennas.

14. The system according to claim 11, wherein each of the plurality of receivers is connected with, at any given time, only one of the groups of receiving antennas.

15. The system according to claim 1, wherein each subzone is covered by one receiving antenna and the multiplexer, at any given time, selects only one receiving antenna.

16. The system according to claim 1, wherein the system comprises mutually different groups of receiving antennas, and the multiplexer, at any given time, selects only one group of receiving antennas.

17. The system according to claim 1, wherein the receiving signal comprises a received electromagnetic signal, wherein the transmitting and receiving system further comprises an analog to digital convertor for obtaining digitalized receiving signals, and wherein the multiplexer, at any given time, connects the time selected receiving antenna or group of receiving antennas with an A/D convertor for obtaining a digitalized receiving signal that has been stripped of the carrier wave and which is supplied to the signal processing unit for further processing.

18. The system of claim 1, wherein the multiple ones of the receiving signal, processed by the processing unit, are a set of receiving signals received by the at least one of the receiving antenna or the group of receiving antennas.

19. The system according to claim 1, wherein the plurality of the receiving antennas are further designed as a walk-through, walk-along or walk-over antenna.

20. The system according to claim 1, wherein the signal processing unit, in use, correlates different ones of the receiving signal with each other.

21. The system according to claim 1, wherein the system further comprises a plurality of transmitting antennas connected with the single transmitter.

22. The system according to claim 1, wherein the transmitting and receiving system is further adapted to generate the interrogation field in the form of a rotating field.

23. The system according to claim 1, wherein the transmitting and receiving system is further adapted to determine in which subzone the label is present.

24. The system according to claim 1, wherein the transmitting and receiving system is further adapted to determine in which direction the label moves through the detection zone.

25. The system according to claim 1, further comprising multiple labels, wherein the labels are l&R labels.

26. The system according to claim 1, wherein the label is an l&R label.

27. The system according to claim 1, wherein the plurality of the receiving antennas are included in a housing.

28. The system according to claim 1, wherein said discrete electromagnetic signals, generated by labels, are received separately from each other.

29. A system for recognizing animals in a detection zone wherein the animals are provided with labels that respond by transmitting return signals with information when the labels are introduced into an electromagnetic interrogation field, the system comprising:
a transmitting and receiving system configured to create the electromagnetic interrogation field throughout the detection zone and receive a return signal from a label present in the detection zone, the transmitting and receiving system comprising:
at least one transmitter and a transmitting antenna connected to the single transmitter, the single transmitter and the transmitting antenna being configured to generate the electromagnetic interrogation field throughout the detection zone,
a plurality of receiving antennas, distinct from the transmitting antenna, configured to receive the return signal from the label present in the detection zone, the plurality of receiving antennas being designed and arranged to discretely receive electromagnetic signals, generated by labels, respectively coming from mutually different subzones, the mutually different subzones, in combination, forming the detection zone,
a multiplexer signally connected with each of the plurality of receiving antennas, and
a signal processing unit,
wherein the transmitting and receiving system generates a receiving signal per receiving antenna or per group of receiving antennas of the plurality of receiving antennas,
wherein the processing unit is configured to process, in combination, multiple ones of the receiving signal to render information from the return signal from the label, received by at least one of the receiving antenna or the group of receiving antennas, antennas, present in the detection zone,
wherein the multiplexer is configured to time select the receiving antenna or the group of receiving antennas from the plurality of receiving antennas, to successively obtain the receiving signal from a time selected receiving antenna or group of receiving antennas,
wherein the receiving signal from the time selected receiving antenna or group of receiving antennas is supplied to the signal processing unit to be processed further, and
wherein the multiplexer, for each time selection, connects the time selected receiving antenna or group of receiving antennas with a receiver for obtaining the receiving signal that is stripped of a carrier wave.

30. The system of claim 29, wherein the multiple ones of the receiving signal, processed by the processing unit, are a set of receiving signals received by the at least one of the receiving antenna or the group of receiving antennas.

* * * * *